United States Patent
Mitchell et al.

(10) Patent No.: US 11,203,185 B2
(45) Date of Patent: Dec. 21, 2021

(54) PARTIALLY-FLUORINATED SILANE BONDING AGENT

(71) Applicant: 3M INNOVATIVE PROPERTIES COMPANY, St. Paul, MN (US)

(72) Inventors: Michael H. Mitchell, Woodbury, MN (US); Miguel A. Guerra, Woodbury, MN (US); Tho Q. Nguyen, Bloomington, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 17/269,815

(22) PCT Filed: Dec. 20, 2018

(86) PCT No.: PCT/US2018/066688
§ 371 (c)(1),
(2) Date: Feb. 19, 2021

(87) PCT Pub. No.: WO2020/040802
PCT Pub. Date: Feb. 27, 2020

(65) Prior Publication Data
US 2021/0260854 A1    Aug. 26, 2021

Related U.S. Application Data

(60) Provisional application No. 62/720,470, filed on Aug. 21, 2018.

(51) Int. Cl.
*B32B 25/08* (2006.01)
*B32B 25/20* (2006.01)
(Continued)

(52) U.S. Cl.
CPC .............. *B32B 25/08* (2013.01); *B32B 7/12* (2013.01); *B32B 25/20* (2013.01); *B32B 27/26* (2013.01);
(Continued)

(58) Field of Classification Search
None
See application file for complete search history.

(56) References Cited

U.S. PATENT DOCUMENTS

| | | |
|---|---|---|
| 5,726,247 A | 3/1998 | Michalczyk |
| 6,632,585 B1 | 10/2003 | Nakamura |

(Continued)

FOREIGN PATENT DOCUMENTS

| | | |
|---|---|---|
| JP | 2000-248114 | 9/2000 |
| WO | WO 2011-005443 | 1/2011 |

(Continued)

OTHER PUBLICATIONS

International Search Report for PCT International Application No. PCT/US2018/066688, dated May 17, 2019, 5 pages.

*Primary Examiner* — Ramsey Zacharia
(74) *Attorney, Agent, or Firm* — Thomas M Spielbauer

(57) ABSTRACT

Articles comprising a fluoropolymer-containing composition bonded to a silicone polymer-containing composition are described, where at least one of the compositions comprise a partially-fluorinated silane bonding agent. Methods of preparing such articles, and exemplary articles such as fuel hoses are also described.

20 Claims, 1 Drawing Sheet

(51) Int. Cl.
  *B32B 7/12*   (2006.01)
  *B32B 27/26*  (2006.01)
  *B32B 27/32*  (2006.01)
(52) U.S. Cl.
  CPC ........ *B32B 27/322* (2013.01); *B32B 2597/00* (2013.01)

(56) References Cited

U.S. PATENT DOCUMENTS

| | | |
|---|---|---|
| 2002/0132902 A1 | 9/2002 | Shiono |
| 2004/0175526 A1 | 9/2004 | Corveleyn |
| 2007/0014994 A1* | 1/2007 | Corveleyn .............. B32B 25/08 428/421 |
| 2008/0205950 A1 | 8/2008 | Moorlag |
| 2013/0108876 A1 | 5/2013 | Komori |

FOREIGN PATENT DOCUMENTS

| | | |
|---|---|---|
| WO | WO 2018-008505 | 1/2018 |
| WO | WO 2019-133410 | 7/2019 |
| WO | WO 2020-055444 | 3/2020 |

* cited by examiner

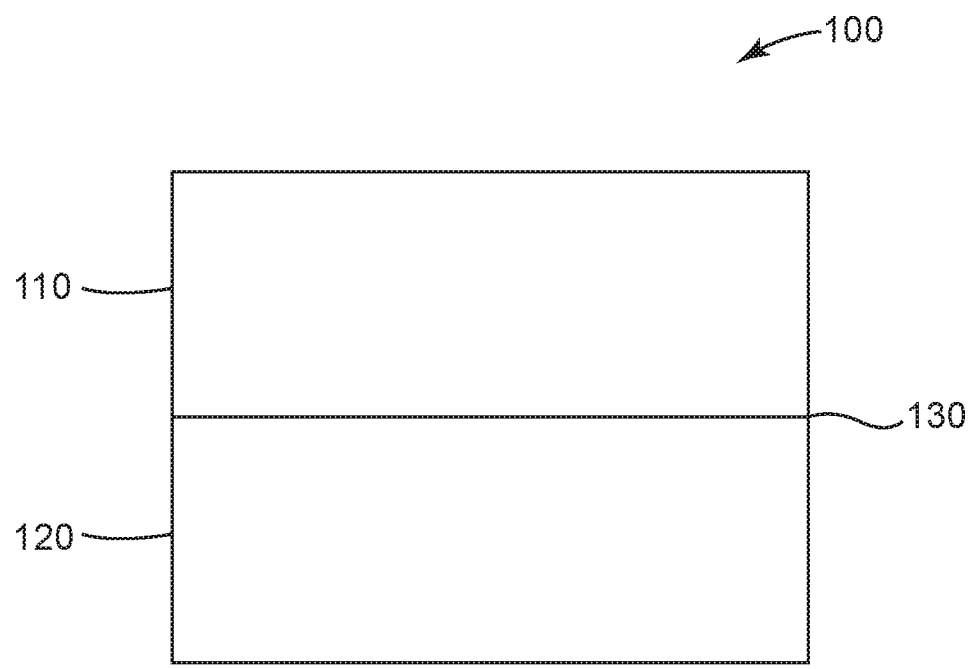

PARTIALLY-FLUORINATED SILANE BONDING AGENT

CROSS REFERENCE TO RELATED APPLICATIONS

This application is a national stage filing under 35 U.S.C. 371 of PCT/US2018/066688, filed Dec. 20, 2018, which claims the benefit of U.S. Provisional Application No.62/720,470, filed Aug. 21, 2018, the disclosure of which is incorporated by reference in their entirety herein.

FIELD

The present disclosure relates to partially-fluorinated silane bonding agents, methods of using such agents to bond silicones to fluoroelastomers, and bonded articles incorporating such bonding agents.

SUMMARY

Briefly, in one aspect, the present disclosure provides an article comprising a first composition comprising a fluoropolymer, a second composition comprising a silicone polymer, wherein the second composition is bonded to the first composition, and a partially-fluorinated silane bonding agent according to Formula I:

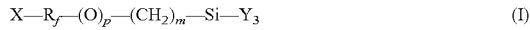

$$X-R_f-(O)_p-(CH_2)_m-Si-Y_3 \quad (I)$$

wherein: X is $CH_2=CH-$, $CH_2=CHCH_2-$, $CH_2=CHCH_2-O-$, or $CF_2=CF-O-$;

$R_f$ is a perfluoro(alkylene) group having 1 to 8 carbon atoms and, optionally, at least one catenary heteroatom selected from the group consisting of O and N;

m is an integer from 2 to 5; p is 0 or 1; and

Y is Cl or $-OR$, where R is a linear or branched alkyl having 1 to 4 carbon atoms. In some embodiments, Y is $-O(CH_2)_xCH_3$, where x is an integer from 0 to 3.

In some embodiments, p is 0 such that the bonding agent is a partially-fluorinated silane bonding agent according to Formula II:

$$X-R_f-(CH_2)_m-Si-Y_3. \quad (II)$$

In some embodiments, the first composition comprises at least a portion of the partially-fluorinated silane bonding agent. In some embodiments, the second composition comprises at least a portion of the partially-fluorinated silane bonding agent. In some embodiments, both the first composition and the second composition comprise at least a portion of the partially-fluorinated silane bonding agent.

In some embodiments, the fluoropolymer is a peroxide-curable fluoropolymer. In some embodiments, the peroxide-curable fluoropolymer comprises a curesite group selected from the group consisting of Br, I, CN or a combination thereof.

In some embodiments, the article is a hose, an O-ring, a seal, a diaphragm, a valve, or a container, optionally wherein the hose is a turbo charger hose or a fuel line.

The above summary of the present disclosure is not intended to describe each embodiment of the present invention. The details of one or more embodiments of the invention are also set forth in the description below. Other features, objects, and advantages of the invention will be apparent from the description and from the claims.

BRIEF DESCRIPTION OF THE DRAWING

FIGURE illustrates a bonded article according to some embodiments of the present disclosure.

DETAILED DESCRIPTION

The beneficial properties of fluoropolymers are well known in the art and include high temperature resistance, high chemical resistance, including for example high resistance to solvents, fuels and corrosive chemicals, and non-flammability. Because of these beneficial properties, fluoropolymers find wide application particularly where materials are exposed to high temperatures or aggressive chemicals. For example, because of their excellent resistance to fuels and their good barrier properties, fluoropolymers are commonly used in fuel management systems including fuel tanks, and fuel lines (e.g., fuel filler lines and fuel supply lines).

Fluoropolymers are generally more expensive than polymers that do not contain fluorine. To reduce the overall cost of an article, materials have been developed in which the fluoropolymer is used in combination with other materials. For example, hoses containing fluoropolymers are typically prepared as multi-layer articles using a relatively thin layer of a fluoropolymer, typically a fluoroelastomer, at the interface where chemical resistance is required, such as an inner or an outer layer. The other layers of such multi-layer hoses typically contain non-fluorine containing elastomers, such as silicone-containing polymers. One requirement of those layered articles is a firm and reliable bond between the fluoropolymer layer and its adjacent layer(s). However, satisfactory bonding of a fluoropolymer to other polymers, particularly silicones, is often difficult, particularly after prolonged exposure at elevated temperatures.

The present inventors discovered that, when the bonding of a first composition containing a fluoropolymer to a second composition containing a silicone polymer is carried out in the presence of a partially-fluorinated silane bonding agent, significant improvements in the bond between the two compositions can be achieved. The bonding agent can be present in the first composition, in the second composition, or in both the first and second compositions. By incorporating a bonding agent directly in the one or more of the compositions, the need for surface treatments or primer coatings is eliminated. However, such treatments may still be used.

Generally, the bonding agent is a partially-fluorinated silane bonding agent according to Formula I:

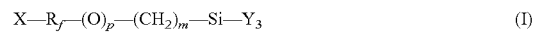

$$X-R_f-(O)_p-(CH_2)_m-Si-Y_3 \quad (I)$$

wherein: X is $CH_2=CH-$, $CH_2=CHCH_2-$, $CH_2=CHCH_2-O-$, or $CF_2=CF-O-$;

$R_f$ is a perfluoro(alkylene) group having 1 to 8 carbon atoms and, optionally, at least one catenary heteroatom selected from the group consisting of O and N;

m is an integer from 2 to 5;

p is 0 or 1; and

Y is $-Cl$ or $-OR$, where R is a linear or branched alkyl having 1 to 4 carbon atoms.

Independent of other selections, in some embodiments, p is 0, and the bonding agent a partially-fluorinated silane bonding agent according to Formula II:

$$X-R_f-(CH_2)_m-Si-Y_3. \quad (II)$$

Independent of other selections, in some embodiments, X is a non-fluorinated group, i.e., X is selected from the group consisting of $CH_2$=CH, $CH_2$=$CHCH_2$+, and $CH_2$=$CHCH_2$+O+. In some embodiments, X is $CH_2$=CH—.

Independent of other selections, in some embodiments, $R_f$ is a linear or branched perfluoro(alkylene) group, e.g., a linear perfluoro(alkylene) group having the formula $(CF_2)_n$ wherein n is an integer from 1 to 8. In some embodiments, n is 3 or 4, e.g., n is 4. In some embodiments, $R_f$ comprises at least 5 carbon atoms, and five or six carbon atoms of $R_f$ are bonded together to form a ring.

Independent of other selections, in some embodiments, Y is $O(CH_2)_xCH_3$. In some embodiments, x is 0 or 1, i.e., Y is selected from the group consisting of $OCH_3$ and $OCH_2CH_3$.

Independent of other selections, in some embodiments, m is 2 or 3, e.g., m=2.

In some embodiments, the bonding agent a partially-fluorinated silane bonding agent according to Formula II, wherein Y is —$O(CH_2)_xCH_3$; x is 0 or 1 (e.g., x=0); n=3 or 4 (e.g., n=4); and m=2 or 3 (e.g., m=2).

In some embodiments, the bonding agent a partially-fluorinated silane bonding agent according to Formula III,

$$X-C_4F_8-CH_2-CH_2-Si-(OCH_3)_3 \qquad (III)$$

which corresponds to Formula I, where $R_f(CF_2)_n$ wherein n is 4, p is 0, m is 2, and Y is —$O(CH_2)_xCH_3$ wherein x is 0. In some embodiments, X is $CH_2$=CH—, and the partially-fluorinated silane bonding agent is $CH_2$=$CHC_4F_8$—$CH_2$—$CH_2$—Si—$(OCH_3)_3$.

Examples of partially-fluorinated silane bonding agents of the present disclosure include:

| | |
|---|---|
| MV4ETCS | $CF_2$=CF—O—$C_4F_8$—$CH_2CH_2$—$SiCl_3$ |
| MV4ETMS | $CF_2$=CF—O—$C_4F_8$—$CH_2CH_2$—$Si(OCH_3)_3$ |
| MV4PTCS | $CF_2$=CF—O—$C_4F_8$—$CH_2CH_2CH_2$—$SiCl_3$ |
| MV4PTMS | $CF_2$=CF—O—$C_4F_8$—$CH_2CH_2CH_2$—$Si(OCH_3)_3$ |
| AC4PTCS | $CH_2$=$CHCH_2$—$C_4F_8$—$CH_2CH_2CH_2$—$SiCl_3$ |
| AC4PTMS | $CH_2$=$CHCH_2$—$C_4F_8$—$CH_2CH_2CH_2$—$Si(OCH_3)_3$ |
| AEC4EPTCS | $CH_2$=$CHCH_2$—O—$C_4F_8$—O—$CH_2CH_2CH_2$—$SiCl_3$ |
| AEC4EPTMS | $CH_2$=$CHCH_2$—O—$C_4F_8$—O—$CH_2CH_2CH_2$—$Si(OCH_3)_3$ |
| VC4ETCS | $CH_2$=CH—$C_4F_8$—$CH_2CH_2$—$SiCl_3$ |
| VC4ETMS | $CH_2$=CH—$C_4F_8$—$CH_2CH_2$—$Si(OCH_3)_3$ |

One exemplary method of making useful partially fluorinated silane bonding agents begins with a compound having the fluorinated group ($R_f$) linking a desired functional group (X) to a group having a terminal alkene. This compound may then be monohydrosilylated with trichlorosilane using a platinum catalyst. This synthetic method is illustrated by the generic Scheme 1 below.

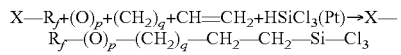

$$X-R_f+(O)_p+(CH_2)_q+CH=CH_2+HSiCl_3(Pt) \rightarrow X-R_f-(O)_p-(CH_2)_q-CH_2-CH_2-Si-Cl_3$$

wherein $R_f$, X, and p are as defined herein for Formula I, and q is 0 to 3. In some embodiments, the starting compound is symmetrical, i.e., X is CH=$CH_2$—$(CH_2)_q$—$(O)_p$—. For example, if p and q are 0, then X is $CH_2$=CH—; if p is 0 and q is 1, then X is $CH_2$=$CHCH_2$—; and if p is 1 and q is 1, then X is $CH_2$=$CHCH_2$—O—. In some embodiments, the starting compound is not symmetrical, as the functional group, X, may be independently selected from the group having a terminal alkene. For example, in some embodiments, X is $CF_2$=CF—O—.

In some methods, such trichlorosilane compounds can be reacted with an alcohol to produce easier to handle trialkoxy silanes. This synthetic method is illustrated by the generic Scheme 2 below wherein a linear alcohol is used as an exemplary alcohol.

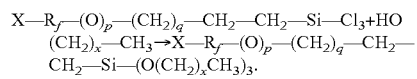

$$X-R_f-(O)_p-(CH_2)_q-CH_2-CH_2-Si-Cl_3+HO(CH_2)_xCH_3 \rightarrow X-R_f-(O)_p-(CH_2)_q-CH_2-CH_2-Si-(O(CH_2)_xCH_3)_3.$$

The partially-fluorinated silane bonding agents of the present disclosure were found to improve the bond between a fluoropolymer-containing composition and a silicone-containing composition. The partially-fluorinated silane bonding agent may be include in either one or both compositions.

The first composition contains at least one fluoropolymer. In some embodiments, the composition consists of one or more fluoropolymers. In some embodiments, the first composition contains at least 50% by weight, at least 75%, at least 80%, at least 90%, or even at least 95% by weight of fluoropolymer(s) based on the total weight of the first composition.

The fluoropolymer may have a partially or fully fluorinated backbone. Suitable fluoropolymers are those that have a backbone that is at least 30% by weight fluorinated, preferably at least 50% by weight fluorinated, more preferably at least 65% by weight fluorinated. Examples of fluoropolymers include polymers and copolymers of one or more fluorinated monomers optionally in combination with one or more non-fluorinated monomers. Examples of fluorinated monomers include fluorinated C2-C8 olefins that may or may not have hydrogen and/or chlorine atoms such as tetrafluoroethylene (TFE), chlorotrifluoroethylene (CTFE), 2-chloropentafluoropropene, dichlorodifluoroethylene, vinyl fluoride, vinylidene fluoride (VDF), fluorinated alkyl vinyl monomers such as hexafluoropropylene (HFP); fluorinated vinyl ethers, including perfluorinated vinyl ethers (collectively referred to as PVE) and fluorinated allyl ethers including perfluorinated allyl ethers (collectively referred to as PAE). Suitable non-fluorinated comonomers include vinyl chloride, vinylidene chloride and C2-C8 olefins such as ethylene (E) and propylene (P).

In some embodiments, the fluoropolymer is substantially amorphous. This means the polymer has no melting point or no distinct melting point but rather a melting range extending over at least 10° C., for example a melting range of from 270 to 285° C. Amorphous fluoropolymers include, for example, copolymers of vinylidene fluoride and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical. Specific examples of copolymers include for example copolymers having a combination of monomers as follows: VDF-HFP, TFE-P, VDF-TFE-HFP, VDF-TFE-PVE, TFE-PVE, E-TFE-PVE and any of the aforementioned copolymers further including units derived from a chlorine containing monomer such as CTFE. Still further examples of suitable amorphous copolymers include copolymers having a combination of monomers as in CTFE-P.

In some embodiments, the amorphous fluoropolymers comprise from 20 to 85%, preferably 50 to 80% by moles of repeating units derived from VDF and TFE, which may or may not be copolymerized with one or more other fluorinated ethylenically unsaturated monomer, such as HFP and/or one or more non-fluorinated C2-C8 olefins, such as ethylene and propylene.

When included, the units derived from the fluorinated ethylenically unsaturated comonomer are generally present at between 5 and 45 mole %, e.g., between 10 and 40 mole %, based on the total moles of comonomers in the fluoropolymer. When included, the units derived from the non-fluorinated comonomers are generally present at between 1 and 50 mole %, e.g., between 1 and 30 mole %, based on the total moles of comonomers in the fluoropolymer.

In some embodiments, the fluoropolymers are curable and can be cross-linked. In some embodiments, the fluoropolymers are already elastic or become elastic after curing or their elasticity can be improved by curing. Typically, elastic polymers can be stretched upon application of a force but retain their original shape once that force is no longer applied.

In some embodiments, the fluoropolymers are curable by a peroxide curing reaction. This means the fluoropolymers are curable by one or more peroxide curing agents or the radicals generated by the peroxide curing agents. Coagents may be used in combination with peroxide curing agent(s).

In some embodiments, the peroxide-curable fluoropolymer comprises a curesite group selected from the group consisting of Br, I, CN or a combination thereof. Such curesite groups may be incorporated into the fluoropolymer using any of a variety of known means. For example, a curesite monomer (CSM) may be used. Generally, any known CSM comprising a bromo-group, an iodo-group, or a cyano-group may be used. Such CSMs are well-known, as are their methods of incorporation into fluorinated polymers. Alternatively, or in addition, curesite groups may be introduced using chain transfer agents that comprise a bromo-group, an iodo-group, or a cyano-group. Such chain transfer agents are well-known, as are their methods of incorporation into fluorinated polymers.

The fluoropolymers can be made in accordance with any of the known polymerization methods for making fluoropolymers. Such methods include without limitation, aqueous emulsion polymerization, suspension polymerization and polymerization in an organic solvent.

The first composition may be prepared by mixing one or more fluoropolymers with additional ingredients in conventional rubber processing equipment. Such equipment includes rubber mills, internal mixers, such as Banbury mixers, and mixing extruders.

Exemplary additional ingredients may include, for example, curing agents, coagents, and acid-acceptors. Other additional ingredients may also include, for example, carbon black, stabilizers, plasticizers, lubricants, fillers, and processing aids typically utilized in fluoropolymer compounding, provided they have adequate stability for the intended service conditions.

The second composition contains at least one silicone polymer. In some embodiments, the second composition consists of one or more silicone polymers. In some embodiments, the second composition contains at least 50% by weight, at least 75%, at least 80%, at least 90%, or even at least 95% by weight of silicone polymer(s) based on the total weight of the second composition.

In some embodiments, the silicone polymer is a polysiloxane. A polysiloxane comprises repeating —Si—O—Si— units. In some embodiments, the polysiloxanes comprise polydimethylsiloxane. The silicone-containing polymers are preferably curable. In some embodiments, the curable polymers become elastic upon curing or their elastic properties are increased upon curing. Cured or partially cured silicone-containing polymers (also referred to as "silicone rubbers") are generally elastomeric, which means they have elastic properties.

In addition to the silicone polymer(s), the second composition may contain curing agents, catalysts and cross-linkers. The silicone polymer composition may further include other additives, such as, for example, fillers, process aids, antioxidants, pigments and the like to obtain certain performance characteristics. For example, silica, e.g., fumed silica, is a common filler used to reinforce strength properties. Other common additives include precipitated silica, titanium dioxide, calcium carbonate, magnesium oxide and ferric oxide.

In some embodiments, the silicones are curable by a peroxide curing reaction. This means the silicones are curable by one or more peroxide curing agents or the radicals generated by the peroxide curing agents. Coagents may be used in combination with peroxide curing agent(s).

A composition containing one or more silicone-containing polymers may be prepared, for example, by mixing the ingredients in conventional rubber processing equipment. Such equipment includes rubber mills, internal mixers, such as Banbury mixers, and mixing extruders.

In some embodiments, the first composition includes a bonding agent according to the present disclosure. In some embodiments, the second composition includes a bonding agent according to the present disclosure. In some embodiments, both the first and the second composition include a bonding agent according the present disclosure.

The optimum amounts of the partially-fluorinated silane bonding agents to be used typically depend on the nature of the bonding agent and the other components of the composition to which the bonding agent is added. Optimum amounts can be readily determined by routine experimentation.

When added to the fluoropolymer composition, typical amounts of bonding agent are between 0.1 and 10% by weight, preferably between 0.5 and 5% by weight, based on the weight of fluoropolymer. When added to the silicone composition, the bonding agent is generally used in an amount of 0.1 to 15% by weight, preferably between 1 and 10% by weight, based on the weight of silicone in the composition.

When added to both the fluoropolymer composition and the silicone composition, the bonding agent is generally used in an amount of 0.1 to 5% by weight in the fluoropolymer composition (based on the weight of the fluoropolymer in the composition) and in an amount of 0.1 to 10% by weight in the silicone composition (based on the weight of the silicone polymer in the composition). In some embodiments, the same bonding agent is used in both the first and second compositions. In some embodiments, bonding agents used in the first and second composition are independently selected, e.g., to achieve the desired compatibility.

In some embodiments, the first composition is a solid composition. For example, the first composition may be formed into a sheet, a layer, a laminate, a tube, or other article. In some embodiments, the second composition is a solid composition. For example, the second composition may be formed a sheet, a layer, a laminate, a tube, or other article.

The compositions may then be laminated together in the presence of the bonding agent using effective heat and pressure for an effective time to create a strong bond. As is known by one of ordinary skill, the effective amount of heat, pressure, and time are interrelated, and may also depend in the specific fluoropolymer and silicone compositions. Effective and optimum bonding conditions may be determined by routine experimentation.

For example, bonding may be achieved by contacting the first and second compositions such that a common interface is formed. The compositions are then subjected to conditions such that at least the fluoropolymer cures. In some embodiments, the silicone polymer may also cure. It may be sufficient to cure locally, i.e. to cure only the parts of the compositions that form the common interface.

In some embodiments, curing and bonding may be achieved by heating the first composition while it is in contact with second composition to a temperature of 120° C. to 200° C. for 1 to 120 minutes (e.g., 140° C. to 180° C. for 3 to 60 minutes). In some embodiments, the heating may be carried out while simultaneously applying pressure, e.g., at least 5 MPa, at least 10 MPa, or even at least 25 MPa. Generally, pressures greater than 200 MPa are not required. In some embodiments, the pressure is no greater than 100, e.g. no greater than 50 MPa.

Alternatively, both compositions may be contacted in molten form, for example, during co-extrusion or injection molding. It is also possible to coat one of the compositions onto the other. For example, one of the compositions may be a liquid or in the form of a liquid coating composition. Such a composition may be applied as a coating to the other composition, which may be provided in the form of, e.g., a layer, a sheet, a film a laminate, a tube or other article.

Alternative methods of forming multilayer articles include coextrusion, sequential extrusion, and injection molding to name a few. It is also possible to prepare a multilayer article by a repeated cycle of coating a liquid silicone polymer composition onto a layer of a fluoropolymer composition. It is also possible to form one or more of the individual layers by extrusion coating, e.g., using a crosshead die.

The heat and pressure of the method by which the layers are brought together (e.g. extrusion or lamination) can be sufficient to provide adequate adhesion between the layers. It may, however, be desirable to further treat the resulting article, for example, with additional heat, pressure, or both, to enhance the bond strength between the layers and to post cure the laminate. One way of supplying additional heat when the multi-layer article is prepared by extrusion is by delaying the cooling of the multi-layer article at the conclusion of the extrusion process.

Alternatively, additional heat energy can be added to the multi-layer article by laminating or extruding the layers at a temperature higher than necessary for merely processing the components. As another alternative, the finished multi-layer article can be held at an elevated temperature for an extended period of time. For example, the finished article can be placed in a separate apparatus for elevating the temperature of the article such as an oven, an autoclave or heated liquid bath. Combinations of these methods can also be used.

An exemplary article according to some embodiments of the present disclosure, in the form of a simple two-layer laminate, is shown in the FIGURE. Article (100) comprise first layer (110), bonded to second layer (120) at interface (130). First layer (110) comprises the first composition, i.e., the fluoropolymer containing composition. Second layer (120) comprises the second composition, i.e., the silicone polymer containing composition. One or both the first and second compositions comprise a partially-fluorinated silane bonding agent of the present disclosure.

Any article in which a fluoropolymer containing layer is bonded to the silicone polymer layer can be made. Such articles include hoses, tubes, O-rings, seals, diaphragms, valves, containers or simple laminates. Those articles may be used, for example in motor vehicles, such as motor crafts, aircrafts and water crafts and include turbo charger hoses, fuel lines, fuel tanks and the like. Articles may also be used in medical applications, for examples as tubes, hoses or lining in a medical apparatus or valves, O-rings and seals in a medical apparatus or device.

Hoses can be made in which a layer of fluoropolymer (typically an elastomer), generally as an innermost layer, is bonded to a silicone polymer (typically a silicone rubber), as the outer layer or as a middle layer.

The following examples are provided to illustrate certain embodiments but are not meant to be limiting in any way. Unless specified otherwise, percentages are percentages by weight with respect to the mass of the total compositions and add up in each case to 100 weight percent.

TABLE 1

Summary of materials used in the preparation of the examples.

| I.D. | Material | Details |
| --- | --- | --- |
| FP03620 | 67.5% F terpolymer, 20 MV, with iodine end groups | Available from 3M. |
| FP03650 | 67.5% F terpolymer, 50 MV, with iodine end groups | Available from 3M. |
| CB-1 | Carbon black | Commercially available from Cancarb Ltd, Medicine Hat, AB, Canada under the trade designation "THERMAX N990 ULTRA PURE". |
| CB-2 | Carbon black | Commercially available from Harwick Standard, Akron, OH, under the trade designation "N326 Carbon Black" |
| CB-3 | Carbon black | Commercially available from Carbonneat, Cornelius, NC, under the trade designation "Neat90" |
| TAIC-1 | Triallyl-isocyanurate | Commercially available from Nippon Kasei Chemical Co. Ltd., Tokyo, Japan, under the trade designation "TAIC" |
| TAIC-2 | 72% active dry liquid concentrate of triallyl-isocyanurate | available from Harwick Standard, Akron, OH under the trade designation "TAIC DLC ®-A 72%". |

TABLE 1-continued

Summary of materials used in the preparation of the examples.

| I.D. | Material | Details |
|---|---|---|
| DBPH | 2,5-dimethyl-2,5-di(t-butylperoxy)-hexane, about 50% active on an inert carrier | Available under the trade designation "VAROX DBPH-50" from Vanderbilt Chemicals, LLC., Norwalk, CT. |
| DCP | Dicumyl peroxide | Available under the trade designation "DiCup 40C" from Harwick Standard, Akron, OH. |
| VC4ETMS | $CH_2=CH-C_4F_8-CH_2CH_2-Si(OCH_3)_3$ | Prepared as described herein |
| Silicone-PO | Peroxide curing silicone rubber | Available from Wacker Chemie AG, Munchen, DE under the trade designation "ELASTOSIL R760/70". |

Preparation of VC4ETCS ($CH_2=CH-C_4F_8-CH_2CH_2-SiCl_3$).

To a 600 mL stirred reactor, available from Parr Instrument Company, Moline, Ill., USA, was charged 500 g (1.1 mol) of $IC_4F_8I$, 17 g (0.07 mol) of t-amylperoxy-2-ethylhexanoate stirred and heated to 60° C. Ethylene was charged to 139 kPa (20 psig) over 1 hour adding 28 g (1 mol) of ethylene. The reactor was cooled to 25° C. and 518 g mixture containing 16 mol % of $IC_2H_4C_4F_8C_2H_4I$ was isolated. The product of five runs was combined. Distillation gave 510 g pot bottoms having a boiling point greater than 100° C. at 7 Torr as mostly $IC_2H_4C_4F_8C_2H_4I$.

To a 2 L 3-neck, round bottom flask equipped with a mechanical stirrer, thermocouple and condenser 510 g (1.0 mol) of $IC_2H_4C_4F_8C_2H_4I$, 500 g methanol was charged and stirred. A charge of 540 g, (2.5 mol) of sodium methoxide as a 25 wt. % solution was added over 1 hour at 36° C. The mixture was allowed to reflux at 65° C. for 1 hour and distilled over into a receiver containing water to isolate 81 g (0.31 mol) of $CH_2=CHC_4F_8CH=CH_2$.

In a pressure glass tube containing a magnetic stir bar was charged 81 g (0.32 mol) $CH_2=CHC_4F_8CH=CH_2$ and 14 g (0.10 mol) trichlorosilane, ten drops of Platinum divinyl tetramethyl disiloxane complex were added and the tube was sealed and heated to 125° C. for 3 hours. The solution was vacuum stripped to first remove excess divinyl octafluorobutane, then isolate 25 g (0.06 mol) of $CH_2=CHC_4F_8CH_2CH_2SiCl_3$ having a boiling point of 88° C. at 6 Torr for a 62% yield. NMR confirmed the compound.

Preparation of VC4ETMS ($CH_2=CHC_4F_8CH_2CH_2Si(OCH_3)_3$).

To a 250 mL 3-neck, round bottom flask containing a magnetic stir bar, thermocouple and condenser was charged 12 g methanol. The methanol was stirred and 25 g (0.06 mol) of the VC4ETCS was added dropwise. The reaction was stirred at 30° C. for 15 min and vacuum distillation isolated 19.3 g (0.05 mol) of $CH_2=CH-C_4F_8CH_2CH_2Si(OCH_3)_3$ having a boiling point of 66° C. at 2 Torr for an 80% yield. NMR confirmed the compound.

Two fluoropolymer compositions were compounded on a two-roll mill with the amounts of materials listed in Table 2. These samples did not contain a partially-fluorinated silane bonding agent.

TABLE 2

Compositions of fluoropolymers without a bonding

| Material | FP-A1 | FP-A2 |
|---|---|---|
| FP3620 | 100 | — |
| FP3650 | — | 100 |
| CB-1 | 30 | — |
| CB-2 | — | 5 |
| CB-3 | — | 20 |
| TAIC-2 | — | 3 |
| TAIC-1 | 3 | — |
| DBPH | 2 | 2 |

Next, fluoropolymers containing a bonding agent were prepared by taking 100 grams of FP-A1 and FP-A2 respectively, blending the samples on a two-roll mill, and adding VC4ETMS as outlined in Table 3.

TABLE 3

Compositions of fluoropolymers with a bonding agent.

| Formulation | FP-B1 | FP-B2 |
|---|---|---|
| Compound 1 | 100 | — |
| Compound 2 | — | 100 |
| VC4ETMS | 2 | 2 |

Silicones with (Si-B1) and without (Si-A1) a bonding agent were prepared by blending the samples on a two-roll mill and adding VC4ETMS as outlined in Table 4.

TABLE 4

Compositions of silicone polymers Si—A and Si—B.

| Formulation | Si—Al | Si—Bl |
|---|---|---|
| Silicone—PO | 100 | 100 |
| DCP | 1 | 1 |
| VC4ETMS | 0 | 2 |

Examples were prepared by taking 50 g of a selected fluoropolymer compound, 50 grams of a selected silicone compound, and pressing the samples together at 171° C. (340° F.) at 138 MPa (10 tons) for 10 minutes. Samples were then post cured at 200° C. (392° F.) for 4 hours. Once post cured, the samples were exposed to thermal aging at 232° C. (450° F.) for 2 hours.

The laminated samples included unbonded tabs of both the fluoropolymer layer and the silicone layer. The bond between the fluoropolymer composition and the silicone composition was tested by inserting these tabs in the opposite jaws on an MTS Tensile Tester and then separating the jaws in an attempt to peel the bonded compositions apart.

If either the fluoropolymer of the silicone tore, it indicated that the bond between the compositions exceeded the internal strength of the compositions. This resulted in a "Pass" rating. If, instead, failure occurred at the interface between the fluoropolymer and silicone compositions, a "Fail" rating was assigned. The results are summarized in Table 5.

TABLE 5

Test results.

| Sample | EX-1 | EX-2 | EX-3 | EX-4 | EX-5 | EX-6 | CE-1 | CE-2 |
|---|---|---|---|---|---|---|---|---|
| Fluoropolymer | FP-A1 | FP-A2 | FP-B1 | FP-B2 | FP-B1 | FP-B2 | FP-A1 | FP-A2 |
| Silicone | Si-B1 | Si-B1 | Si-B1 | Si-B1 | Si-A1 | Si-A1 | Si-A1 | Si-A1 |
| Bonding after Post Cure | Pass | Pass | Pass | Pass | Pass | Pass | Pass | Pass |
| Bonding after Thermal Aging | Pass | Pass | Pass | Pass | Pass | Pass | Fail | Fail |

As shown in Table 5, regardless of whether a bonding agent of the present invention is included in (i) only the silicone compound (EX-1 and 2), (ii) only the fluoropolymer composition (EX-5 and 6), or (iii) both the fluoropolymer and the silicone compositions (EX-3 and 4); the bond between the fluoropolymer and the silicone is improved after thermal aging as compared to when no bonding agent is used (CE-1 and 2).

Various modifications and alterations of this invention will become apparent to those skilled in the art without departing from the scope and spirit of this invention.

What is claimed is:

1. An article comprising a first composition comprising a fluoropolymer and a second composition comprising a silicone polymer, wherein the second composition is in direct contact with and bonded to the first composition, wherein at least one of the first composition and the second composition comprises a partially-fluorinated silane bonding agent according to Formula I:

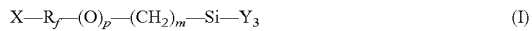

wherein: X is $CH_2=CH-$, $CH_2=CHCH_2-$, $CH_2=CHCH_2-O-$, or $CF_2=CF-O-$;
$R_f$ is a perfluoro(alkylene) group having 1 to 8 carbon atoms and, optionally, at least one catenary heteroatom selected from the group consisting of O and N;
m is an integer from 2 to 5;
p is 0 or 1; and
Y is $-Cl$ or $-OR$, where R is a linear or branched alkyl having 1 to 4 carbon atoms.

2. The article of claim 1, wherein p is 0 such that the bonding agent is a partially-fluorinated silane bonding agent according to Formula II:

3. The article of claim 1, wherein $R_f$ is a linear or branched perfluoro(alkylene) group.

4. The article of claim 3, wherein $R_f$ is a linear perfluoro(alkylene) group having the formula $(CF_2)_n$ wherein n is 3 or 4, optionally wherein n is 4.

5. The article according to claim 1, wherein $R_f$ comprises at least 5 carbon atoms, and five or six carbon atoms of $R_f$ are bonded together to form a ring.

6. The article according to claim 1, wherein m is 2 or 3, optionally wherein m is 2.

7. The article according to claim 1, wherein Y is $-O(CH_2)_xCH_3$, where x is an integer from 0 to 3.

8. The article of claim 7, wherein x is 0, such that Y is $-OCH_3$.

9. The article of claim 8, wherein m is 2, and n is 4 such that the bonding agent is a partially-fluorinated silane bonding agent according to Formula III:

10. The article according to claim 1, wherein X is selected from the group consisting of $CH_2=CH-$, $CH_2=CHCH_2-$, and $CH_2=CHCH_2-O-$.

11. The article of claim 10, wherein X is $CH_2=CH-$.

12. The article according to claim 1, wherein the first composition comprises at least a portion of the partially-fluorinated silane bonding agent.

13. The article of claim 12, wherein the first composition comprises between 0.1 and 10% by weight of the partially-fluorinated silane bonding agent, based on the weight of the fluoropolymer in the first composition.

14. The article according to claim 1, wherein the second composition comprises at least a portion of the partially-fluorinated silane bonding agent.

15. The article of claim 14, wherein the second composition comprises 0.1 to 15% by weight of the partially-fluorinated silane bonding agent, based on the weight of silicone in the second composition.

16. The article according to claim 1, wherein the first composition comprises a portion of the partially-fluorinated silane bonding agent, and the second composition comprises a portion of the partially-fluorinated silane bonding agent.

17. The article of claim 16, wherein the first composition comprises 0.1 to 5% by weight of the partially-fluorinated silane bonding agent based on the weight of the fluoropolymer in the first composition, and the second composition comprises 0.1 to 10% by weight of the partially-fluorinated silane bonding agent based on the weight of the silicone polymer in the second composition.

18. The article according to claim 1, wherein the fluoropolymer is a peroxide-curable fluoropolymer.

19. The article of claim 18, wherein the peroxide-curable fluoropolymer comprises a curesite group selected from the group consisting of Br, I, CN or a combination thereof.

20. The article according to claim 1, wherein the article is a hose, an O-rings, a seal, a diaphragm, a valve, or a container, optionally wherein the hose is a turbo charger hose or a fuel line.

* * * * *